(12) United States Patent
Borges et al.

(10) Patent No.: US 8,225,301 B2
(45) Date of Patent: Jul. 17, 2012

(54) SOFTWARE LICENSING MANAGEMENT

(75) Inventors: Leonardo Jose Borges, Dallas, TX (US); Hsin-Ying Lin, Richardson, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2212 days.

(21) Appl. No.: 11/081,465

(22) Filed: Mar. 16, 2005

(65) Prior Publication Data

US 2006/0212854 A1  Sep. 21, 2006

(51) Int. Cl.
G06F 9/44 (2006.01)

(52) U.S. Cl. .................... 717/163; 717/162

(58) Field of Classification Search .............. 717/162, 717/163
See application file for complete search history.

(56) References Cited

U.S. PATENT DOCUMENTS

| | | | | |
|---|---|---|---|---|
| 5,138,712 | A * | 8/1992 | Corbin | 726/30 |
| 5,530,752 | A * | 6/1996 | Rubin | 705/59 |
| 6,059,838 | A * | 5/2000 | Fraley et al. | 717/108 |
| 6,185,734 | B1 * | 2/2001 | Saboff et al. | 717/164 |
| 6,188,995 | B1 * | 2/2001 | Garst et al. | 705/59 |
| 6,324,649 | B1 | 11/2001 | Eyres | |
| 6,567,107 | B1 * | 5/2003 | Stannard | 715/764 |
| 6,615,359 | B2 | 9/2003 | Eyres | |
| 7,111,285 | B2 * | 9/2006 | Smith et al. | 717/140 |
| 7,225,430 | B2 * | 5/2007 | Eatough et al. | 717/127 |
| 7,472,286 | B2 * | 12/2008 | Burkhardt et al. | 713/193 |
| 7,702,536 | B1 * | 4/2010 | Alabraba et al. | 705/14.16 |
| 7,725,929 | B2 * | 5/2010 | Ostergren et al. | 726/6 |
| 2002/0107750 | A1 * | 8/2002 | Kanevsky et al. | 705/26 |
| 2002/0107809 | A1 * | 8/2002 | Biddle et al. | 705/59 |
| 2002/0133804 | A1 * | 9/2002 | Sheedy | 717/106 |
| 2002/0169625 | A1 | 11/2002 | Yang | |
| 2002/0169725 | A1 * | 11/2002 | Eng | 705/59 |
| 2003/0088516 | A1 | 5/2003 | Remer | |
| 2003/0126456 | A1 | 7/2003 | Birzer | |
| 2003/0135756 | A1 | 7/2003 | Verma | |
| 2003/0160823 | A1 * | 8/2003 | Stannard | 345/764 |
| 2003/0212905 | A1 | 11/2003 | Tran | |
| 2004/0019565 | A1 | 1/2004 | Goringe | |
| 2004/0030564 | A1 | 2/2004 | Hartinger | |
| 2004/0068734 | A1 * | 4/2004 | Bond et al. | 719/328 |
| 2004/0128251 | A1 | 7/2004 | Adam | |
| 2004/0267590 | A1 | 12/2004 | Clark | |
| 2005/0027554 | A1 | 2/2005 | Chahrouri | |
| 2005/0038752 | A1 | 2/2005 | Gaetano | |
| 2005/0049976 | A1 | 3/2005 | Yang | |
| 2005/0050315 | A1 * | 3/2005 | Burkhardt et al. | 713/150 |
| 2006/0212854 | A1 * | 9/2006 | Borges et al. | 717/140 |

OTHER PUBLICATIONS

Blanton et al. "Microsoft Computer Dictionary Fifh Edition", 2002, Microsoft Corporation, Total pp. 4.*
Muller et al., "Validating OpenMP 2.5 for Fortran and C/C++", Aug. 2004, citeseerx.ist.psu.edu, Total pp. 6.*

* cited by examiner

*Primary Examiner* — Don Wong
*Assistant Examiner* — Marina Lee

(57) ABSTRACT

In one embodiment, a method of computing comprises executing a software application, wherein the software application comprises at least first and second versions of a subroutine for performing a specific function, wherein the first version exhibits a first behavior and the second version exhibits a second behavior; and selecting for execution one of the first version or the second version based on whether one or more licensing criteria are satisfied. Optionally, the behavior of second version can be redefined on a user basis. The method can be implemented and distributed within software libraries.

17 Claims, 4 Drawing Sheets

SOFTWARE LICENSING MANAGEMENT

BACKGROUND

Software may be distributed as one or more executable files or as a library, i.e., a collection of files that may be compiled into executable code. Frequently, software developers incorporate one or more software libraries into software programs that are distributed in the form of one or more executable files. In other instances, software developers may distribute software in the form of object code within one or more libraries, and users of the software libraries may generate the executable files.

Software piracy represents a significant economic loss for the producers of software products. Accordingly, software licensing enforcement schemes receive continued attention in the software industry. To date, most software licensing schemes operate according to a model that requires registration and/or the entry of a code, and denies access to users incapable of providing accurate information. Moreover, software licensing for libraries has not been implemented yet to work at run time: to the present date library licensing only occurs either at installation time or when creating executable files. It is desirable to be able to check software library licensing only when the linked application is executed.

In some instances, a more flexible approach to software licensing management is desirable.

SUMMARY

A method of computing comprises executing a software application, wherein the software application comprises at least first and second versions of a subroutine for performing a specific function, wherein the first version exhibits a first behavior and the second version exhibits a second behavior; and selecting for execution one of the first version or the second version based on whether one or more licensing criteria are satisfied.

Optionally, the behavior of second version can be redefined on a user basis. The method can be implemented and distributed within software libraries.

DETAILED DESCRIPTION

Described herein are exemplary system and methods for software licensing management. These methods are particularly useful for licensing software libraries. Certain of the methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Figure 1:
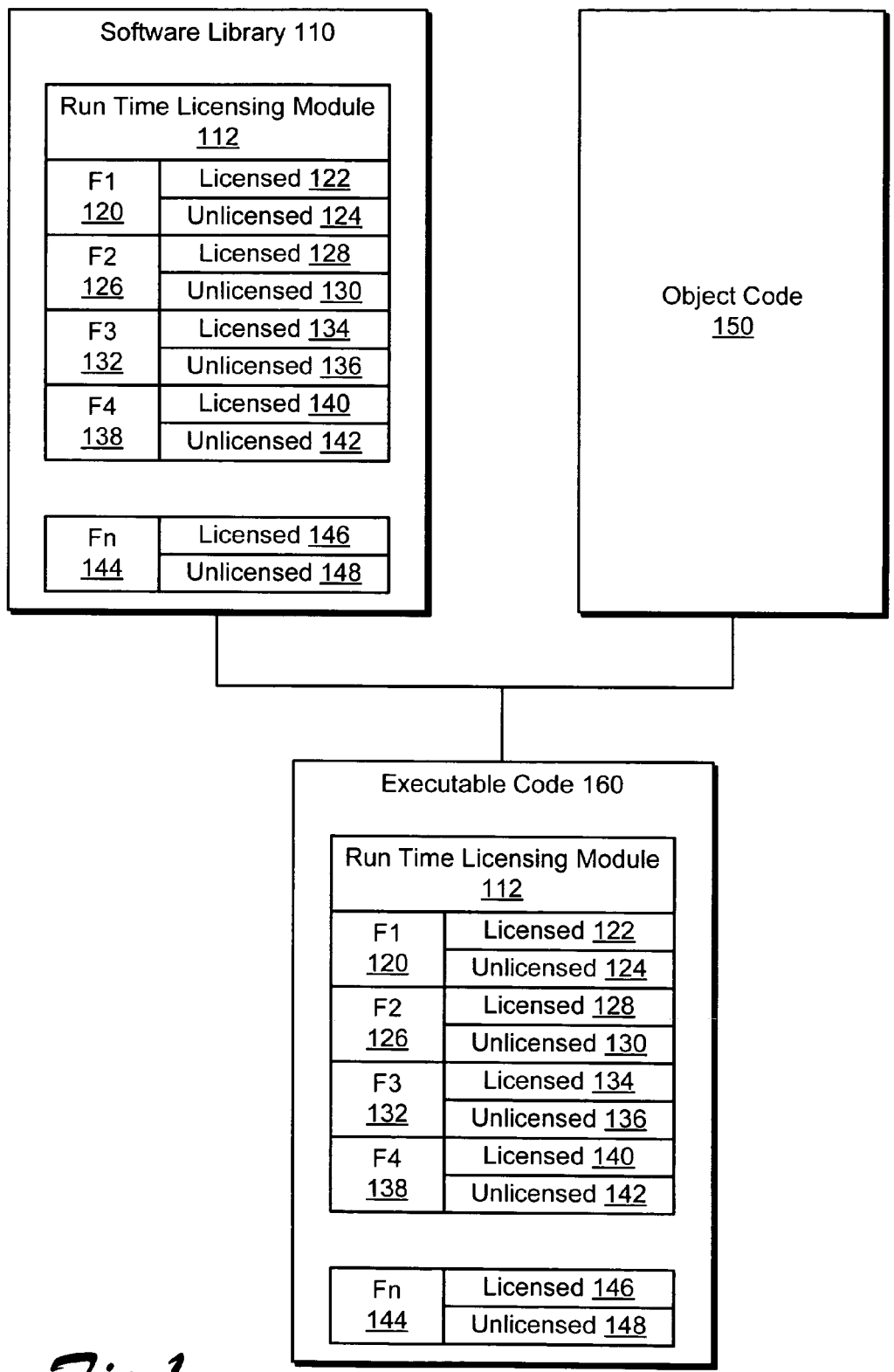
FIG. 1 is a schematic illustration of a software development environment in accordance with an embodiment.

FIG. 1 is a schematic illustration of a software development environment in accordance with an embodiment. Referring to FIG. 1, a software developer may encode one or more software applications in a high-level software language such as, e.g., Fortran, C/C++, Visual Basic, etc., which may be compiled by a conventional compiler into object code 150. The particular software application(s) are not important to the subject matter described herein.

Many commercial software products incorporate one or more subroutines from a commercially available software library such as library 110. Common examples of commercially available libraries include HP-Math Library (MLIB), Intel Math Kernel Library (MKL), AMD Core Math Library (ACML), etc. Such libraries may be linked to the object code 150, e.g., by a linker, and incorporated into the executable code 160 distributed by the software vendor.

Typically, a commercially available library such as library 110 comprises a plurality of subroutines, which are designated as subroutine $F_1$ 120, $F_2$ 126, $F_3$ 132, $F_4$ 138, and may extend through an arbitrary number of subroutines represented by $F_n$ 144. Each subroutine has a unique behavior associated with it. This behavior is referred to herein as the licensed version of the subroutine. Traditional licensing approaches grant access to the licensed version of each subroutine only if a valid license is present and if no valid license is present, the library will stop the executable code from running.

The proposed invention is a software library licensing model where each library subroutine may contain two distinct versions encoded within the library. It allows differentiated behavior based on a valid license for the library been present or not. Unlike previous software library licensing methods, the described method is more flexible by requiring license checking only when the linked application is executed. Moreover, the proposed invention allows software developers to redefine the behavior of the unlicensed version of any give routine. More particularly, software library 110 includes multiple versions of at least one of the subroutines. Hence, FIG. 1 depicts that library 110 includes a licensed version 122 of subroutine $F_1$ and an unlicensed version 124 of subroutine $F_1$. Similarly, software library 110 may include a licensed version 128 and an unlicensed version 130 of subroutine $F_2$ 126, a licensed version 134 and an unlicensed version 136 of subroutine $F_3$ 132, a licensed version 140 and an unlicensed version 142 of subroutine $F_4$ 138, and a licensed version 146 and an unlicensed version 148 of subroutine $F_n$ 144. Software library 110 further includes a run time licensing module 112 that includes logic instructions to detect whether a particular user or piece of computing hardware is licensed to use the executable code.

In one embodiment, object code 150 may be linked to one or more subroutines from software library 110 during a linking process, and may thereby be incorporated into executable code 160. During the linking process both the licensed and unlicensed version of a particular subroutine will be unconditionally incorporated into executable code 160. The software developer may be presented with the option to redefine the unlicensed version of the subprograms to be incorporated into executable code 160. Run time licensing module 112 will also be incorporated into executable code 160. In the illustration provided in FIG. 1, the entire library 110 is incorporated into executable file 160. In practice the entire library or only a subset of the library 110 may be incorporated.

Figure 2:
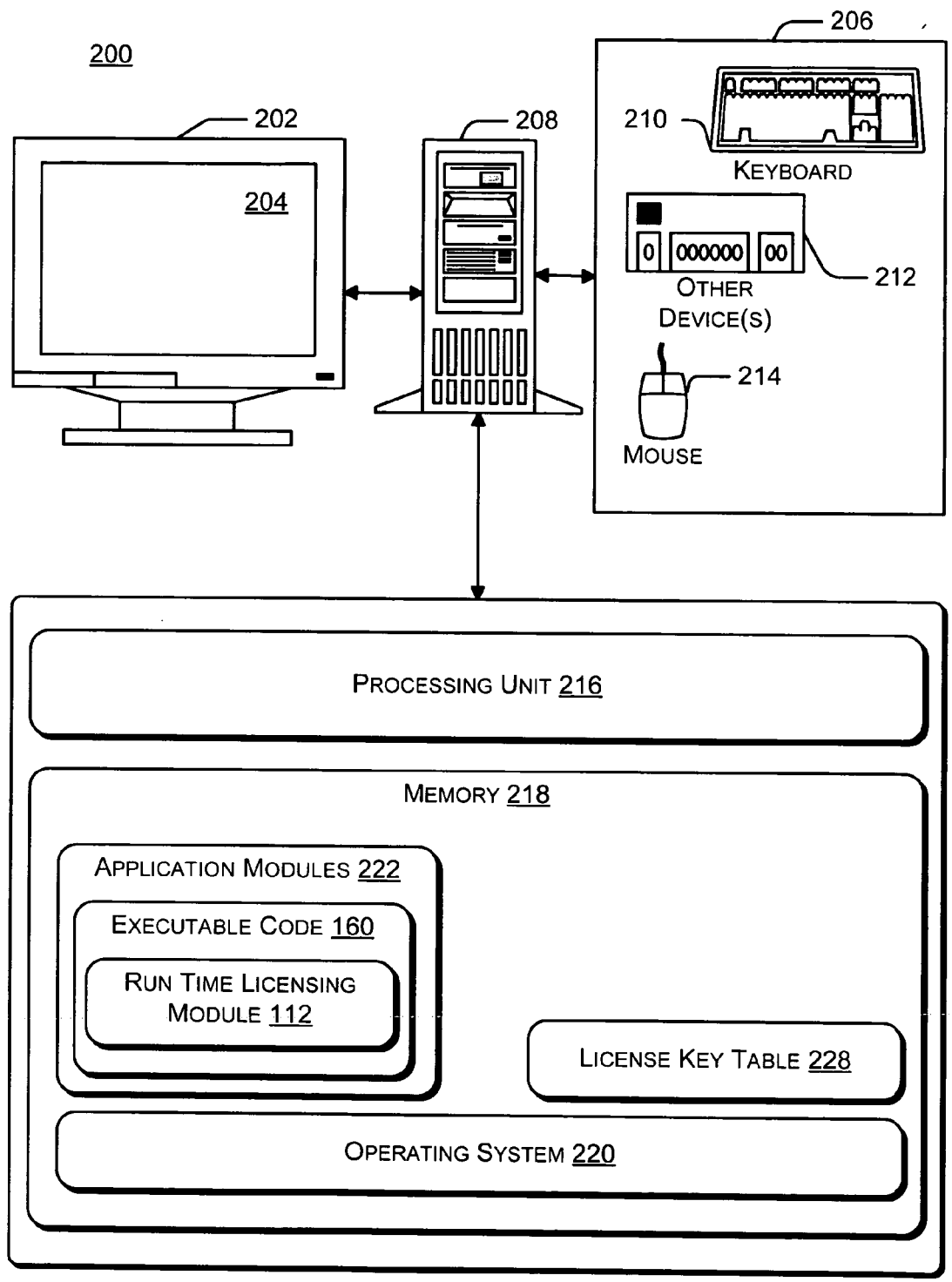
FIG. 2 is a schematic illustration of a computing system in accordance with an embodiment.

The executable code 160 may be distributed to users as a component of a software product which may be executed on a computing system. FIG. 2 is a schematic illustration of an exemplary computer system 200 adapted to implement a software licensing management scheme. This computer system 200 includes a display 202 having a screen 204, one or more user-input devices 206, and a computer 208. The user-input devices 206 can include any device allowing a computer to receive a developer's input, such as a keyboard 210, other device(s) 212, and a mouse 214. The other device(s) 212 can include a touch screen, a voice-activated input device, a track ball, and any other device that allows the system 200 to receive input from a developer and/or a user. The computer 208 includes a processing unit 216 and random access memory and/or read-only memory 218.

Memory 218 includes an operating system 220 for managing operations of computer 208. The particular operating system is not important, and the operating system may be embodied as a commercially available operating system such as the Windows® brand operating system, UNIX, Linux or variants thereof. In one embodiment memory 218 further includes a license key table 228 that includes information identifying licensing criteria that are satisfied for one or more software modules resident in the memory 218 of computer 208. In one embodiment the license key table identifies to software modules if the computer and/or its user are licensed to use. Memory 218 further includes one or more application modules 222, including an application module that comprises executable code 160 and run time licensing module 112. Operation of the system 200 is explained in greater detail below.

Exemplary Embodiments of Operations

Figure 3:
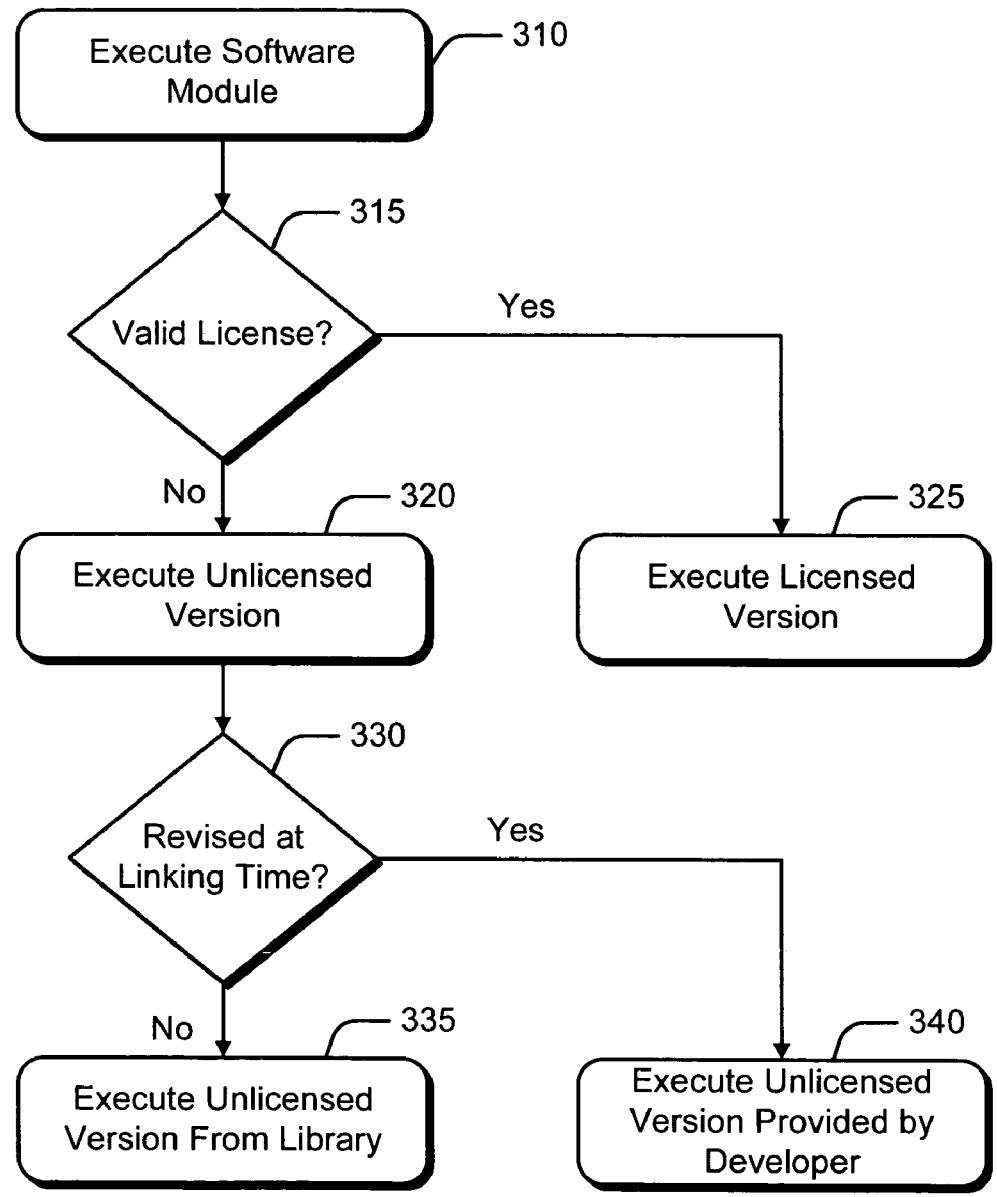
FIG. 3 is a flowchart illustrating operations executed by a computing system in accordance with an embodiment.

In one embodiment, the computer system of FIG. 2 may be configured to execute selectively one of a first version or a second version of a subroutine embedded in executable code 160 based on whether one or more licensing criteria are satisfied. FIG. 3 is a flowchart illustrating operations in an exemplary run time licensing module 112 that may be executed by the computer 208 when the executable code 160 is invoked. Referring to FIG. 3, at operation 310 a user or another software process executing on computer 208 elects to execute a software module that includes executable code 160. At operation 315 the run-time licensing module 112 determines whether the user and/or computer 208 possess a valid license for executable code 160. In one embodiment, the run time licensing module consults the license key table 228 at run time to determine whether a valid license exists.

If, at operation 315, a valid license for the executable code 160 is located in the license key table 228, then control passes to operation 325 and the licensed versions of the subroutines extracted from the library 110 are selected for execution in executable code 160. By contrast, if at operation 315 a valid license for the executable code 160 is not located in the license key table 228, then control passes to operation 320 and unlicensed versions of the subroutines will be selected.

The unlicensed version selected by operation 320 may either be the original unlicensed version provided with the software library, e.g. version 148 of subroutine $F_n$ 144 in FIG. 1, or a redefined version provided by the software developer when linking the software library 110 with the object code 150. If, at linking time a redefined version of the subroutine was provided (operation 330), then control passes to operation 340 and the new unlicensed versions of the subroutines provided by the software developer within the object code 150 are selected for execution in executable code 160. By contrast, if at linking time a redefined version of the subroutine was not provided, then control passes to operation 335 and the unlicensed versions of the subroutines extracted from the library 110 are selected for execution in executable code 160.

In one embodiment function pointers may be used to select between the licensed and the unlicensed versions of the subroutines. By way of example, executable code 160 may declare a user-visible wrapper for a particular function and separate structures for the licensed and unlicensed versions. If, a valid license exists in the license key database 228 then a function pointer may be set to the licensed version. By contrast, if no valid license exists in the license key database 228 then a function pointer may be set to the unlicensed version. By redefining user-visible wrapper, a software developer may redefine the unlicensed version used.

The licensed version of a subroutine in the library 110 exhibits at least one difference in behavior with respect to the unlicensed version of the same subroutine. In one embodiment the licensed version is configured to for normal operation, while the unlicensed version includes a time-out function that operates to throttle the speed of operation of the subroutine. In alternate embodiments the unlicensed version may be configured to present a visible or audible indication that no valid license exists for use of the executable program 160, and/or to transmit a notice to a remote computer (e.g., a license compliance monitoring service) that an unlicensed version of executable program 160 is being used.

Exemplary Computing Environment

Select embodiments discussed herein (such as those discussed with reference to FIG. 1) may include various operations. These operations may be performed by hardware components or may be embodied in machine-executable instructions, which may be in turn utilized to cause a general-purpose or special-purpose processor, or logic circuits programmed with the instructions to perform the operations. Alternatively, the operations may be performed by a combination of hardware and software.

Figure 4:
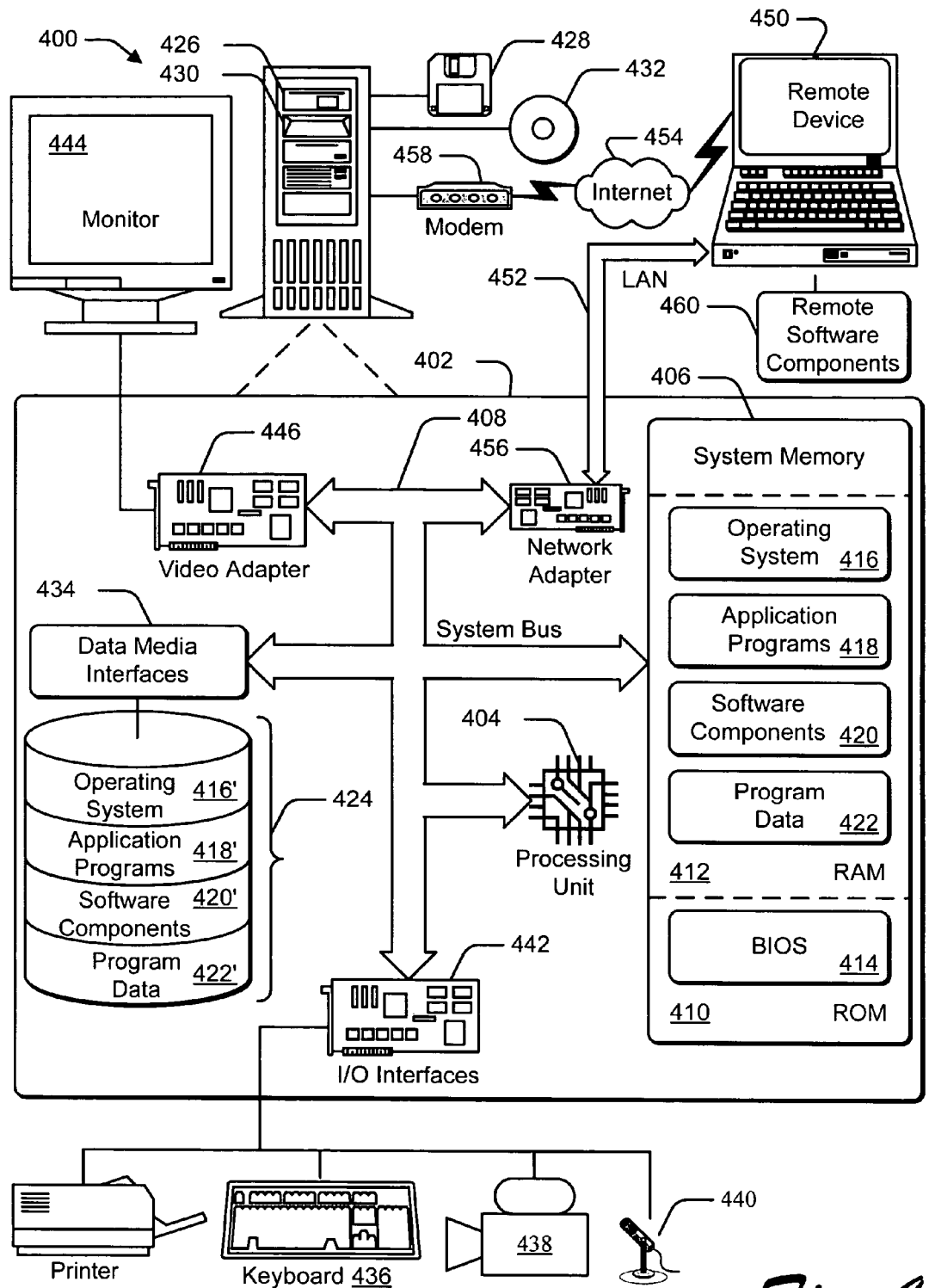
FIG. 4 is a schematic illustration of a computing environment in accordance with an embodiment.

The various components and functionality described herein are implemented with a number of individual computers. FIG. 4 shows components of typical example of such a computer, referred by to reference numeral 400. The components shown in FIG. 4 are only examples, and are not intended to suggest any limitation as to the scope of the functionality of the invention; the invention is not necessarily dependent on the features shown in FIG. 4.

Generally, various different general purpose or special purpose computing system configurations can be used. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

The functionality of the computers is embodied in many cases by computer-executable instructions, such as program modules, that are executed by the computers. Generally, program modules include routines, programs, objects, components, data structures, etc. that perform particular tasks or implement particular abstract data types. Tasks might also be performed by remote processing devices that are linked through a communications network. In a distributed computing environment, program modules may be located in both local and remote computer storage media.

The instructions and/or program modules are stored at different times in the various computer-readable media that are either part of the computer or that can be read by the computer. Programs are typically distributed, for example, on floppy disks, CD-ROMs, DVD, or some form of communication media such as a modulated signal. From there, they are installed or loaded into the secondary memory of a computer. At execution, they are loaded at least partially into the computer's primary electronic memory. The invention described herein includes these and other various types of computer-readable media when such media contain instructions, programs, and/or modules for implementing the steps described below in conjunction with a microprocessor or other data processors. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

With reference to FIG. 4, the components of computer 400 may include, but are not limited to, a processing unit 404, a system memory 406, and a system bus 408 that couples various system components including the system memory 406 to the processing unit 404. The system bus 408 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Computer 400 typically includes a variety of computer-readable media. Computer-readable media can be any available media that can be accessed by computer 400 and includes both volatile and nonvolatile media, removable and non-removable media. By way of example, and not limitation, computer-readable media may comprise computer storage media and communication media. "Computer storage media" includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400.

The system memory 406 includes computer storage media in the form of volatile and/or nonvolatile memory such as read only memory (ROM) 410 and random access memory (RAM) 412. A basic input/output system 414 (BIOS), containing the basic routines that help to transfer information between elements within computer 400, such as during start-up, is typically stored in ROM 410. RAM 412 typically contains data and/or program modules that are immediately accessible to and/or presently being operated on by processing unit 404. By way of example, and not limitation, FIG. 4 illustrates operating system 416, application programs 418, other software components 420, and program data 422.

The computer 400 may also include other removable/non-removable, volatile/nonvolatile computer storage media. By way of example only, the computer system of FIG. 4 may include a hard disk drive 424 that reads from or writes to non-removable, nonvolatile magnetic media, a magnetic disk drive 426 that reads from or writes to a removable, nonvolatile magnetic disk 428, and an optical disk drive 430 that reads from or writes to a removable, nonvolatile optical disk 432 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 424 is typically connected to the system bus 408 through a non-removable memory interface such as data media interface 434, and magnetic disk drive 426 and optical disk drive 430 are typically connected to the system bus 408 by a removable memory interface.

The drives and their associated computer storage media discussed above and illustrated in FIG. 4 provide storage of computer-readable instructions, data structures, program modules, and other data for computer 400. In FIG. 4, for example, hard disk drive 424 is illustrated as storing operating system 416', application programs 418', software components 420', and program data 422'. Note that these components can either be the same as or different from operating system 416, application programs 418, software components 420, and program data 422. Operating system 416, application programs 418, other program modules 420, and program data 422 are given different numbers here to illustrate that, at a minimum, they are different copies. A user may enter commands and information into the computer 400 through input devices such as a keyboard 436 and pointing device 438, commonly referred to as a mouse, trackball, or touch pad. Other input devices (not shown) may include a microphone 440, joystick, game pad, satellite dish, scanner, or the like. These and other input devices are often connected to the processing unit 404 through an input/output (I/O) interface 442 that is coupled to the system bus, but may be connected by other interface and bus structures, such as a parallel port, game port, or a universal serial bus (USB). A monitor 444 or other type of display device is also connected to the system bus 406 via an interface, such as a video adapter 446. In addition to the monitor 444, computers may also include other peripheral output devices (e.g., speakers) and one or more printers 470, which may be connected through the I/O interface 442.

The computer may operate in a networked environment using logical connections to one or more remote computers, such as a remote computing device 450. The remote computing device 450 may be a personal computer, a server, a router, a network PC, a peer device or other common network node, and typically includes many or all of the elements described above relative to computer 400. The logical connections depicted in FIG. 4 include a local area network (LAN) 452 and a wide area network (WAN) 454. Although the WAN 454 shown in FIG. 4 is the Internet, the WAN 454 may also include other networks. Such networking environments are commonplace in offices, enterprise-wide computer networks, intranets, and the like.

When used in a LAN networking environment, the computer 400 is connected to the LAN 452 through a network interface or adapter 456. When used in a WAN networking environment, the computer 400 typically includes a modem 458 or other means for establishing communications over the Internet 454. The modem 458, which may be internal or external, may be connected to the system bus 406 via the I/O interface 442, or other appropriate mechanism. In a networked environment, program modules depicted relative to the computer 400, or portions thereof, may be stored in the remote computing device 450. By way of example, and not limitation, FIG. 4 illustrates remote application programs 460 as residing on remote computing device 450. It will be appreciated that the network connections shown are exemplary and other means of establishing a communications link between the computers may be used.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disk, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method of computing, comprising:
    executing a software application, wherein the software application comprises at least first and second versions of a subroutine for performing a specific function, wherein the first version and the second version are distinctly encoded versions of the subroutine,
    wherein the first version exhibits a first behavior and the second version exhibits a second behavior, wherein the first behavior includes a first operating speed of the subroutine, and the second behavior includes a second, different operating speed of the subroutine; and
    selecting for execution one of the first version or the second version based on whether one or more licensing criteria are satisfied, wherein the first version is selected in response to the one or more licensing criteria being satisfied, and the second version is selected in response to the one or more licensing criteria not being satisfied, wherein the first and second versions of the subroutine are identified by a function pointer, and selecting one of the first version or the second version based on whether the one or more licensing criteria are satisfied comprises setting the function pointer to one of the first version or the second version.

2. The method of claim 1, further comprising altering the second behavior based on a user redefining the second version.

3. The method of claim 1, wherein selecting one of the first version or the second version based on whether the one or more licensing criteria are satisfied comprises determining, at run time, whether the software application meets the one or more licensing criteria.

4. The method of claim 1, wherein the first behavior comprises normal execution of the subroutine and the second behavior further comprises presenting a visual indicia indicating that the one or more licensing criteria are not satisfied.

5. The method of claim 1, wherein the first behavior comprises normal execution and the second behavior further comprises transmitting an indicia to a remote computing device indicating that the one or more licensing criteria are not satisfied.

6. A computer program product stored on a computer readable storage medium, comprising:
    a software application, wherein the software application comprises at least first and second versions of a subroutine for performing a specific function, wherein the first version and the second version are distinctly encoded versions of the subroutine, and wherein the first version exhibits a first behavior that includes a first operating speed of the subroutine and the second version exhibits a second behavior that includes a second, different operating speed of the subroutine; and
    logic instructions, executable on a processor, for selecting for execution one of the first version or the second version based on whether one or more licensing criteria are satisfied, wherein the first version is selected in response to the one or more licensing criteria being satisfied, and the second version is selected in response to the one or more licensing criteria not being satisfied, wherein the first and second versions of the subroutine are identified by a function pointer, and wherein the logic instructions for selecting one of the first version or the second version of the subroutine based on whether the one or more licensing criteria are satisfied comprise logic instructions for setting the function pointer to one of the first version or the second version.

7. The computer program product of claim 6, wherein the second behavior can be altered by allowing an end user to redefine the second version.

8. The computer program product of claim 6, further comprising logic instructions for determining, at run time, whether the software application meets the one or more licensing criteria.

9. The computer program product of claim 6, wherein the second behavior further comprises presenting a visual indicia indicating that the one or more licensing criteria are not satisfied.

10. The computer program product of claim 6, wherein the second behavior further comprises transmitting a signal to a remote computing device indicating that the one or more licensing criteria are not satisfied.

11. The computer program product of claim 6, wherein the software application comprises a plurality of subroutines, each of which comprises a first version that exhibits a first behavior and a second version that exhibits a second behavior.

12. A method of developing a software program product, comprising:
    developing a software application into an object code file,
    linking the object code file to a library of subroutines,
    wherein the library comprises at least first and second versions of a particular one of the subroutines for performing a specific function, wherein the first version and the second version are distinctly encoded versions of the particular subroutine,
    wherein the first version exhibits a first behavior and the second version exhibits a second behavior, wherein the first behavior includes a first operating speed of the particular subroutine, and the second behavior includes a second, different operating speed of the particular subroutine; and wherein the library of subroutines includes logic instructions, executable on a processor, for selecting for execution one of the first version or the second version based on whether one or more licensing criteria are satisfied, wherein the first and second versions of the particular subroutine are identified by a function pointer, and wherein the logic instructions for selecting for execution one of the first version or the second version based on whether the one or more licensing criteria are satisfied comprise logic instructions for setting the function pointer to one of the first version or the second version.

13. The method of claim 12, wherein the second behavior can be altered by allowing an end user to redefine the second version.

14. The method of claim 12, further comprising compiling the object code file, one or more subroutines from the library, and the logic instructions for selecting for execution one of the first version or the second version based on whether the one or more licensing criteria are satisfied into an executable file.

15. The method of claim 12, wherein the logic instructions for selecting for execution one of the first version or the second version based on whether the one or more licensing criteria are satisfied further comprise logic instructions for determining, at run time, whether the software application meets the one or more licensing criteria.

16. The method of claim 12, wherein the first behavior comprises normal execution and the second behavior further comprises presenting a visual indicia indicating that the one or more licensing criteria are not satisfied.

17. The method of claim 12, wherein the first behavior comprises normal execution and the second behavior comprises transmitting a signal to a remote computing device indicating that the one or more licensing criteria are not satisfied.

* * * * *